United States Patent
James (10) Patent No.: US 11,535,178 B1
(45) Date of Patent: Dec. 27, 2022

(54) VEHICLE DASH-MOUNTED HAND SANITIZER DISPENSER

(71) Applicant: Derrick James, Philadelphia, PA (US)

(72) Inventor: Derrick James, Philadelphia, PA (US)

( * ) Notice: Subject to any disclaimer, the term of this patent is extended or adjusted under 35 U.S.C. 154(b) by 142 days.

(21) Appl. No.: 17/121,866

(22) Filed: Dec. 15, 2020

(51) Int. Cl.
*B60R 15/00* (2006.01)
*B60R 15/02* (2006.01)
*A47K 5/12* (2006.01)
*B60R 11/00* (2006.01)

(52) U.S. Cl.
CPC ............ *B60R 15/02* (2013.01); *A47K 5/1208* (2013.01); *A47K 5/1217* (2013.01); *B60R 2011/0008* (2013.01); *B60R 2011/0059* (2013.01)

(58) Field of Classification Search
CPC ........................ B60R 15/02; B60R 2011/0008
See application file for complete search history.

(56) References Cited

U.S. PATENT DOCUMENTS

| | | | |
|---|---|---|---|
| 6,390,329 B1 | 5/2002 | Maddox | |
| 6,820,770 B2 | 11/2004 | Makino | |
| D768,406 S | 10/2016 | Patterson | |
| 9,758,101 B2 | 9/2017 | Clair-Chalupka | |
| 2008/0019489 A1* | 1/2008 | Lynn ...................... | G06Q 30/02 379/93.01 |
| 2009/0127351 A1* | 5/2009 | Powell ...................... | A61L 9/14 239/69 |
| 2009/0140004 A1 | 6/2009 | Scorgie | |
| 2011/0155766 A1 | 6/2011 | Hurley | |
| 2012/0248140 A1 | 10/2012 | Iseri | |
| 2013/0262345 A1* | 10/2013 | Ciavarella ............ | A47K 5/1208 705/500 |
| 2015/0250908 A1* | 9/2015 | Maupin ................. | B05B 12/122 239/69 |
| 2016/0089684 A1 | 3/2016 | Duncan | |
| 2016/0362051 A1* | 12/2016 | Clair-Chalupka ........ | A61L 2/16 |
| 2022/0080811 A1* | 3/2022 | Shaw ................... | B60H 3/0014 |
| 2022/0134971 A1* | 5/2022 | El Cheikh ............... | B60R 15/00 137/899 |

FOREIGN PATENT DOCUMENTS

WO 2006134314 12/2006

* cited by examiner

*Primary Examiner* — J C Jacyna
(74) *Attorney, Agent, or Firm* — Kyle A. Fletcher, Esq.

(57) ABSTRACT

The vehicle dash-mounted hand sanitizer dispenser is configured for use with a vehicle. The vehicle is further defined with a passenger compartment and a vent. The vehicle dash-mounted hand sanitizer dispenser mounts on the vent. The vehicle dash-mounted hand sanitizer dispenser is configured for use with a hand sanitizer. The vehicle dash-mounted hand sanitizer dispenser stores and dispenses the hand sanitizer. The vehicle dash-mounted hand sanitizer dispenser comprises a reservoir structure and a control circuit. The reservoir structure forms the fluidic connection necessary to: a) contain the hand sanitizer; and, b) discharge the hand sanitizer into the passenger compartment. The control circuit is an electric circuit. The control circuit provides the motive forces necessary to pump the hand sanitizer into the passenger compartment. The control circuit initiates the operation by detecting motion near the discharge point of the hand sanitizer.

19 Claims, 8 Drawing Sheets

VEHICLE DASH-MOUNTED HAND SANITIZER DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles including minor accessories for vehicles. (B60R1/12)

SUMMARY OF INVENTION

The vehicle dash-mounted hand sanitizer dispenser is configured for use with a vehicle. The vehicle is further defined with a passenger compartment and a vent. The vent is located in the passenger compartment. The vehicle dash-mounted hand sanitizer dispenser mounts on the vent. The vehicle dash-mounted hand sanitizer dispenser is configured for use with a hand sanitizer. The vehicle dash-mounted hand sanitizer dispenser stores and dispenses the hand sanitizer. The vehicle dash-mounted hand sanitizer dispenser comprises a reservoir structure and a control circuit. The reservoir structure forms the fluidic connection necessary to: a) contain the hand sanitizer; and, b) discharge the hand sanitizer into the passenger compartment. The control circuit is an electric circuit. The control circuit provides the motive forces necessary to pump the hand sanitizer into the passenger compartment. The control circuit initiates the operation by detecting motion near the discharge point of the hand sanitizer.

These together with additional objects, features and advantages of the vehicle dash-mounted hand sanitizer dispenser will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle dash-mounted hand sanitizer dispenser in detail, it is to be understood that the vehicle dash-mounted hand sanitizer dispenser is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle dash-mounted hand sanitizer dispenser.

It is therefore important that the claims be regarded as including such equivalent construction insofar as they do not depart from the spirit and scope of the vehicle dash-mounted hand sanitizer dispenser. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
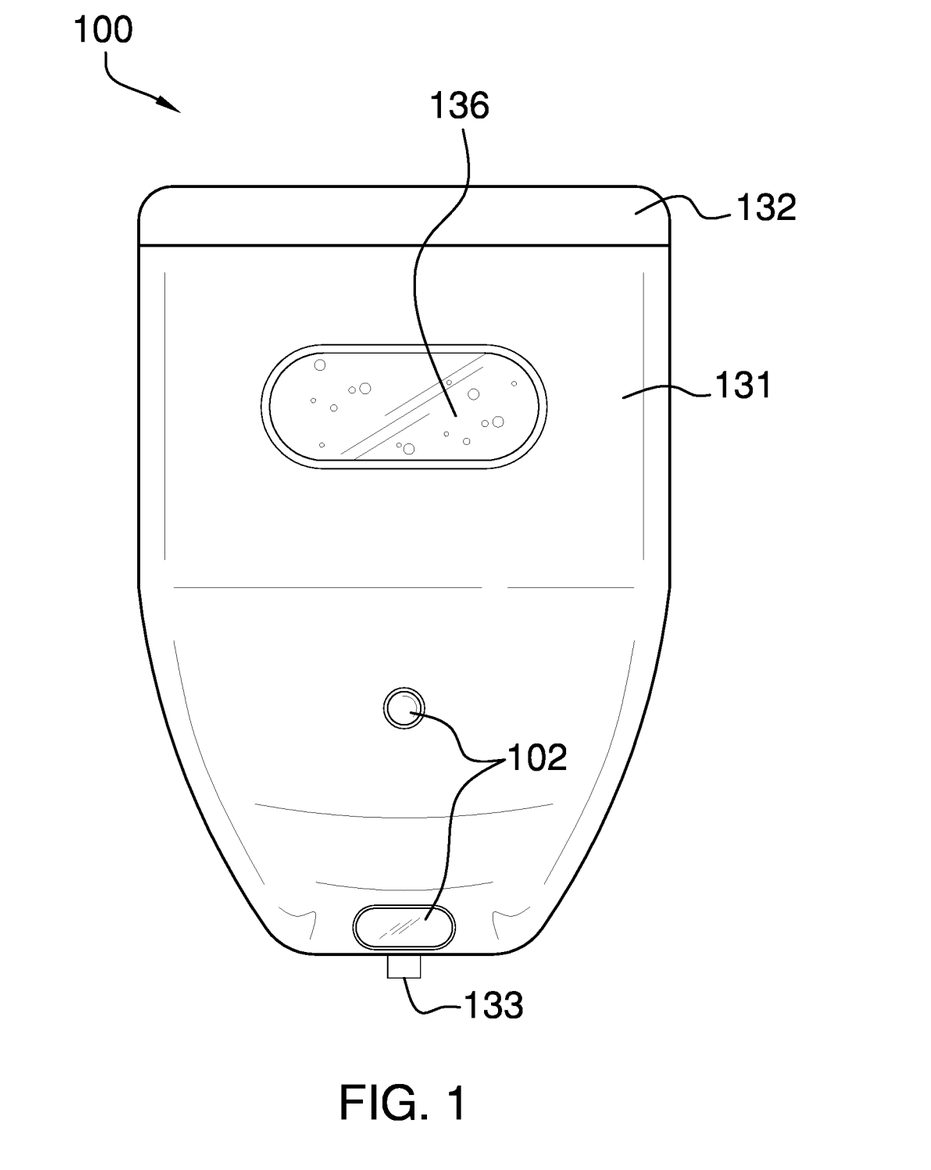
FIG. 1 is a front view of an embodiment of the disclosure.
Figure 2:
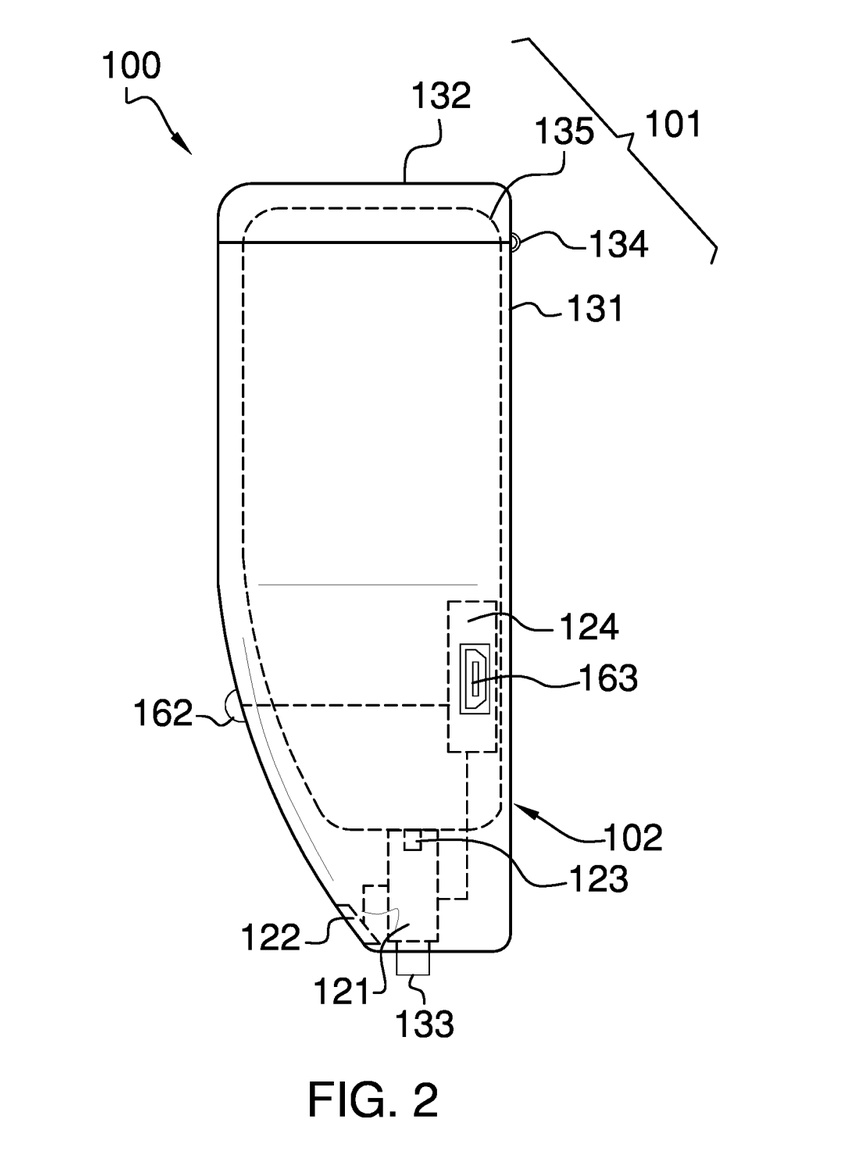
FIG. 2 is a side view of an embodiment of the disclosure.
Figure 3:
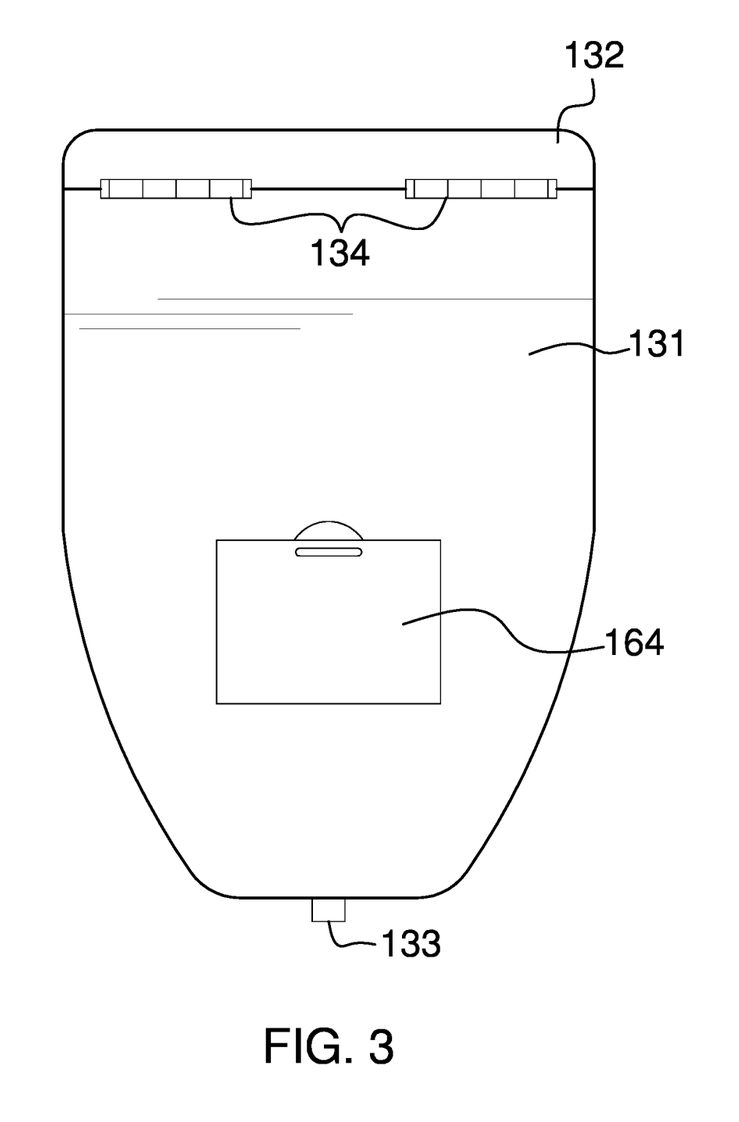
FIG. 3 is a rear view of an embodiment of the disclosure.
Figure 4:
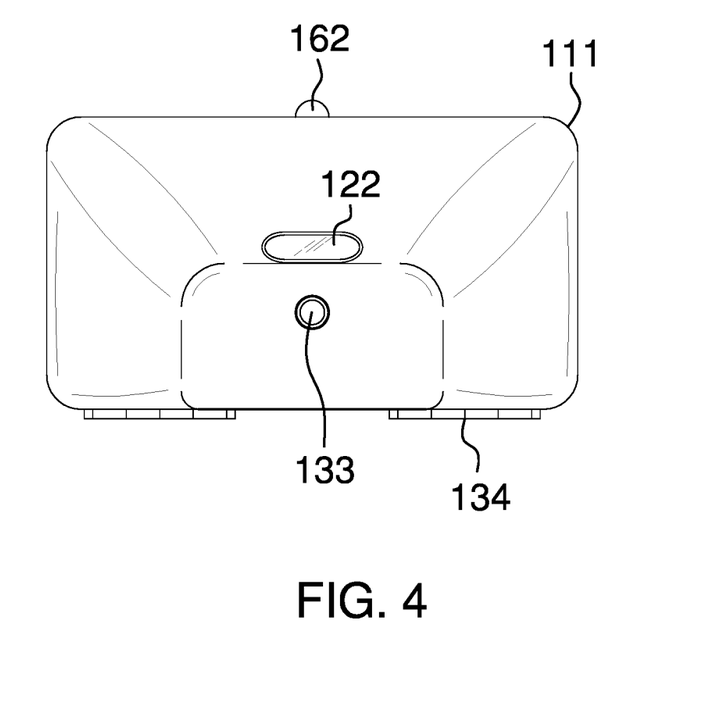
FIG. 4 is a bottom view of an embodiment of the disclosure.
Figure 5:
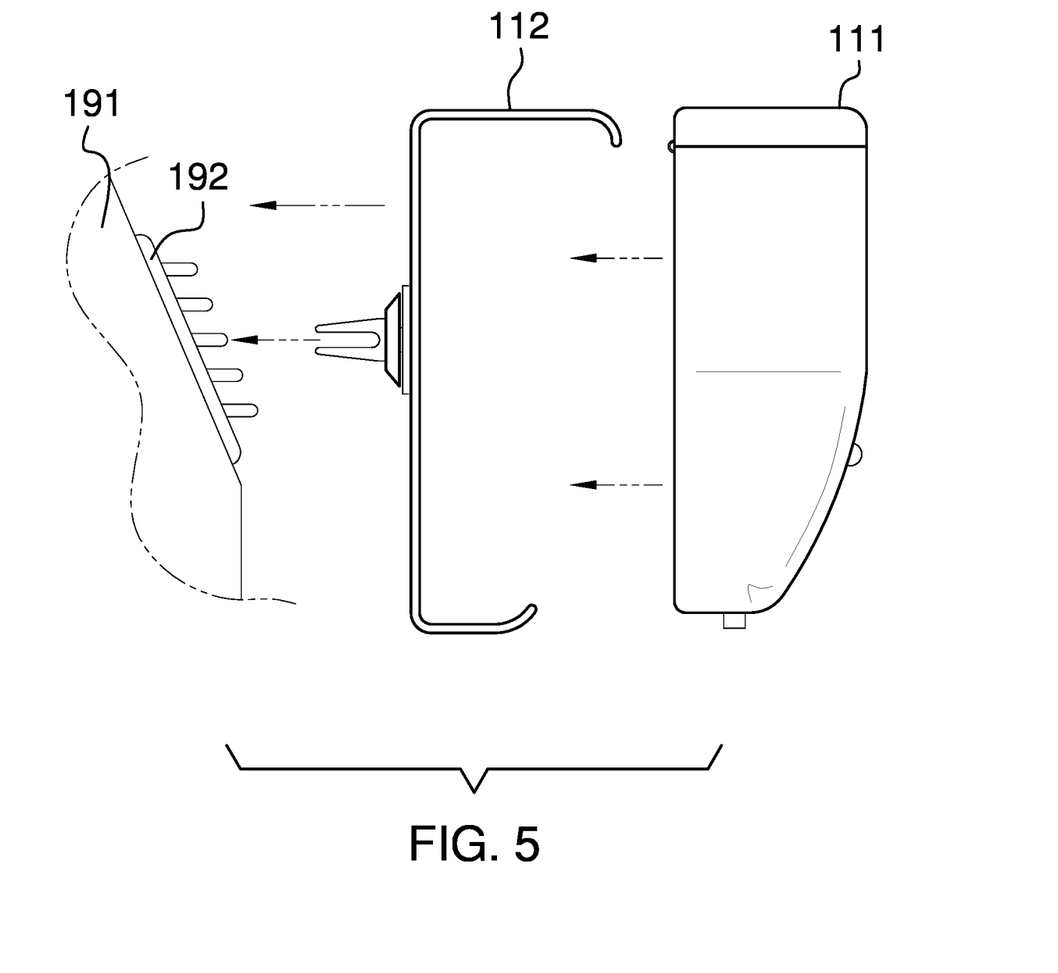
FIG. 5 is an exploded view of an embodiment of the disclosure.
Figure 6:
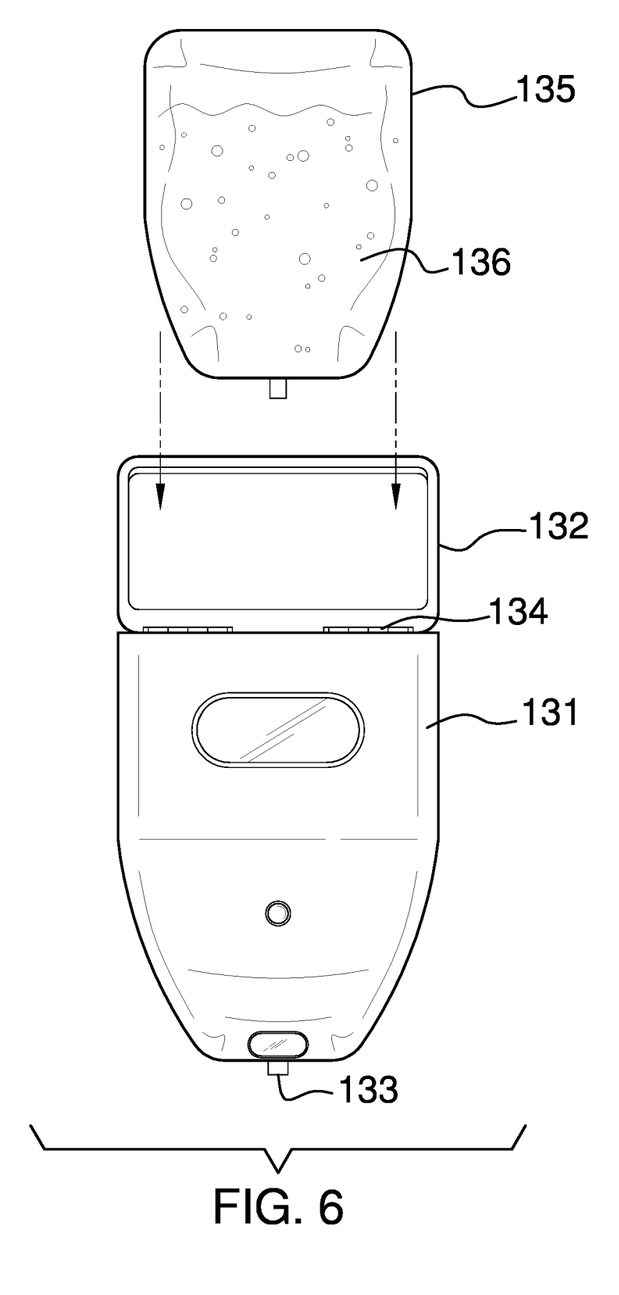
FIG. 6 is an in-use view of an embodiment of the disclosure.
Figure 7:
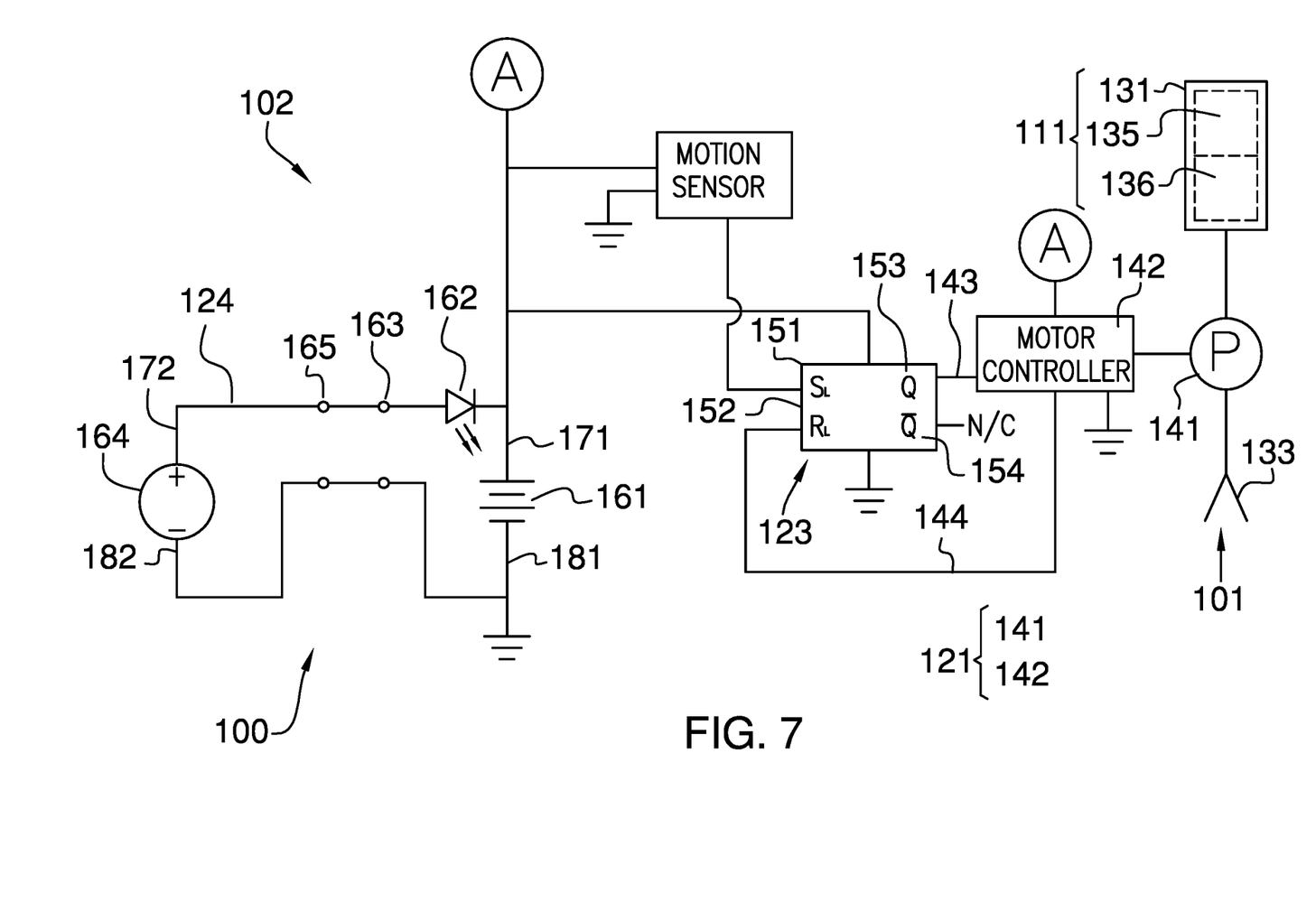
FIG. 7 is a schematic view of an embodiment of the disclosure.
Figure 8:
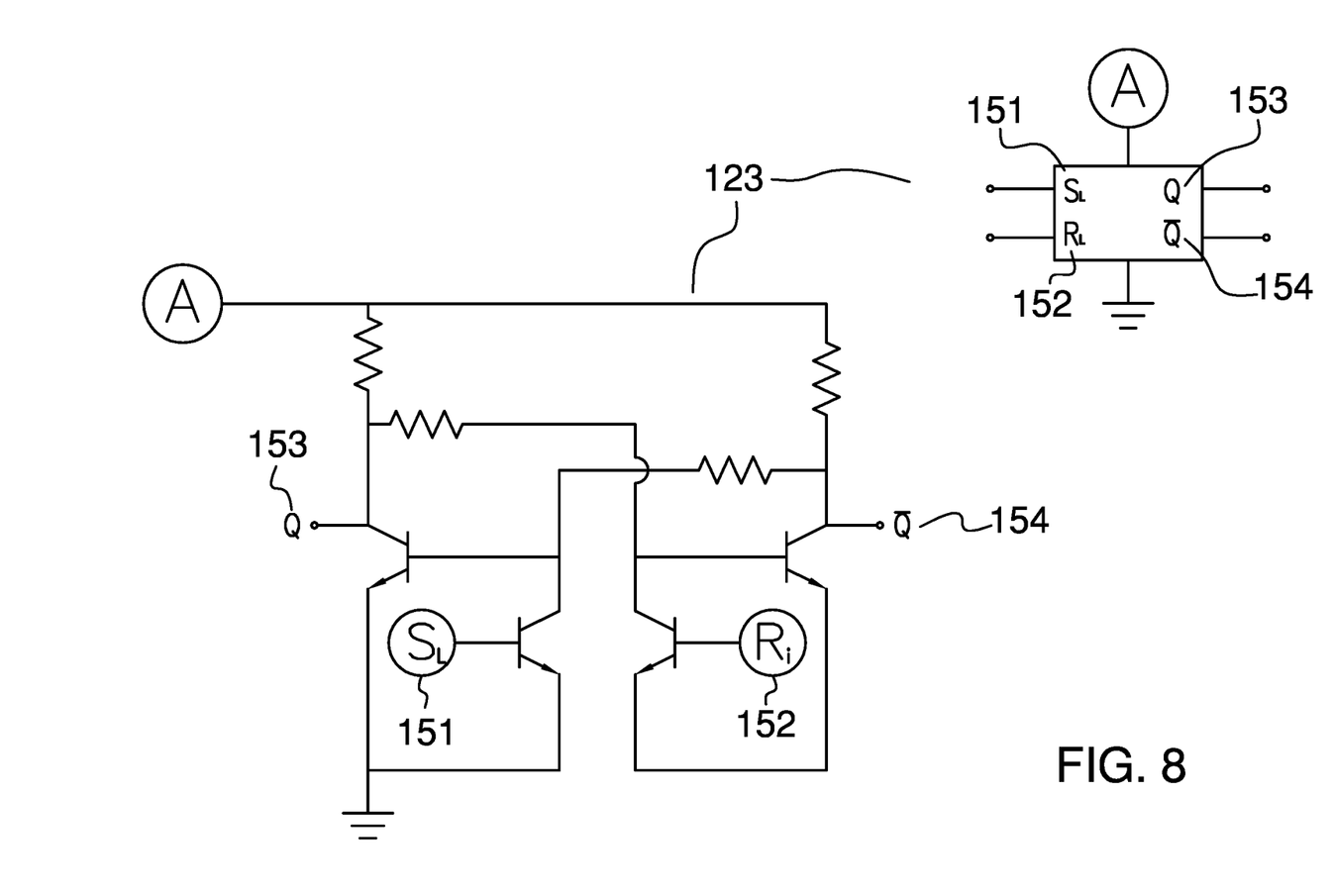
FIG. 8 is a detail view of an embodiment of the disclosure.

Detailed reference will now be made to one or more potential embodiments of the disclosure, which are illustrated in FIGS. 1 through 8.

The vehicle dash-mounted hand sanitizer dispenser 100 (hereinafter invention) is configured for use with a vehicle 191. The vehicle 191 is further defined with a passenger compartment and a vent 192. The vent 192 is located in the passenger compartment. The invention 100 mounts on the vent 192. The invention 100 is configured for use with a hand sanitizer 136. The invention 100 stores and dispenses the hand sanitizer 136. The invention 100 comprises a reservoir 111 structure 101 and a control circuit 102. The reservoir 111 structure 101 forms the fluidic connection necessary to: a) contain the hand sanitizer 136; and, b) discharge the hand sanitizer 136 into the passenger compartment. The control circuit 102 is an electric circuit. The control circuit 102 provides the motive forces necessary to pump the hand sanitizer 136 into the passenger compartment. The control circuit 102 initiates the operation by detecting motion near the discharge point for the hand sanitizer 136. The vehicle 191 is defined elsewhere in this disclosure. The vent 192 is defined elsewhere in this disclosure.

The reservoir 111 structure 101 is a mechanical structure. The reservoir 111 structure 101 forms a negative space that contains the hand sanitizer 136. The reservoir 111 structure 101 forms the fluidic connections necessary to discharge the hand sanitizer 136 from the reservoir 111 structure 101 for use. The reservoir 111 structure 101 removably attaches to the vent 192 of the vehicle 191. The reservoir 111 structure 101 comprises a reservoir 111 and a mount structure 112.

The mount structure 112 is a mechanical structure. The mount structure 112 forms a first clip structure that removably attaches to the reservoir 111. The mount structure 112 forms a second clip structure that removably attaches to the vent 192 of the vehicle 191. The mount structure 112 removably attaches the reservoir 111 to the vent 192 of the vehicle 191.

The reservoir 111 is a mechanical structure. The reservoir 111 is a hollow structure. The reservoir 111 physically contains the control circuit 102. The reservoir 111 physically contains the hand sanitizer 136. The reservoir 111 physically forms the spaces and fluidic connections necessary to: a) store the hand sanitizer 136; and b) transport the hand sanitizer 136 through the reservoir 111 for discharge. The reservoir 111 comprises a reservoir 111 shell 131, a reservoir 111 lid 132, and a discharge nozzle 133.

The reservoir 111 shell 131 is a mechanical structure. The reservoir 111 shell 131 is a hollow structure. The reservoir 111 shell 131 forms the physical space that contains the control circuit 102, the reservoir 111 pouch 135, and the hand sanitizer 136. The mount structure 112 removably attaches to the reservoir 111 shell 131. The reservoir 111 shell 131 comprises a reservoir 111 pouch 135. The reservoir 111 pouch 135 further comprises a hand sanitizer 136.

The reservoir 111 pouch 135 is a pouch. The pouch is defined elsewhere in this disclosure. The reservoir 111 pouch 135 is a flexible structure. The reservoir 111 pouch 135 is formed from a fluid impermeable material. The reservoir 111 pouch 135 forms a containment structure. The reservoir 111 pouch 135 contains the hand sanitizer 136. The reservoir 111 pouch 135 and the contained hand sanitizer 136 are sized such that the reservoir 111 pouch 135 and the hand sanitizer 136 insert into the hollow interior of the reservoir 111. The reservoir 111 pouch 135 inserts into the reservoir 111 shell 131 such that the reservoir 111 pouch 135 forms a fluidic connection with the reservoir 111 that allows the hand sanitizer 136 to flow from the reservoir 111 pouch 135 into the discharge nozzle 133. The hand sanitizer 136 is a fluid phase chemical solution. The hand sanitizer 136 is defined elsewhere in this disclosure.

The discharge nozzle 133 is a nozzle structure that discharges the hand sanitizer 136 from the reservoir 111 structure 101. The discharge nozzle 133 receives the hand sanitizer 136 under pressure from the pump 141 system 121 of the control circuit 102 for discharge into the exterior space surrounding the reservoir 111 structure 101.

The reservoir 111 lid 132 is a mechanical structure that controls access to the hollow interior of the reservoir 111 shell 131. The reservoir 111 lid 132 encloses the open face of the pan structure of the reservoir 111 shell 131. The reservoir 111 lid 132 attaches to the reservoir 111 shell 131. The reservoir 111 lid 132 further comprises a hinge 134. The hinge 134 is a fastening structure. The hinge 134 is a rotating structure. The hinge 134 attaches the reservoir 111 lid 132 to the reservoir 111 shell 131 such that the reservoir 111 lid 132 rotates relative to the reservoir 111 lid 132. The hinge 134 attaches the reservoir 111 lid 132 to the reservoir 111 shell 131 such that the reservoir 111 lid 132 rotates between an open position and a closed position.

The control circuit 102 is an electric circuit. The control circuit 102 controls the operation of the reservoir 111 structure 101. The control circuit 102 provides the motive forces necessary to discharge the hand sanitizer 136 from the reservoir 111 structure 101. The control circuit 102 detects motion in the vicinity of the discharge nozzle 133. Upon detection of motion in the vicinity of the discharge nozzle 133, the control circuit 102 discharges a previously determined amount of hand sanitizer 136 from the reservoir 111 structure 101. The control circuit 102 is an independently powered electric circuit. By independently powered is meant that the control circuit 102 can operate without an electrical connection to an external power source 164. The control circuit 102 comprises a pump 141 system 121, a motion sensor 122, a flip flop 123, and a power circuit 124. The pump 141 system 121, the motion sensor 122, the flip flop 123, and the power circuit 124 are electrically interconnected.

The pump 141 system 121 is an electrically powered mechanical system. The pump 141 system 121 generates a pressure differential that pumps the hand sanitizer 136 from the reservoir 111 pouch 135 to the discharge nozzle 133 for discharge from the reservoir 111 structure 101. The pump 141 system 121 comprises a pump 141 and a motor controller 142.

The pump 141 is a mechanical structure. The pump 141 is a metered pump 141. The pump 141 generates a pressure differential that: a) draws the hand sanitizer 136 from the reservoir 111 pouch 135; and, b) pumps the drawn hand sanitizer 136 to the discharge nozzle 133. The pump 141 is an electrically powered device. By electrically powered is meant that the pump 141 incorporates an electric motor that generates the rotational mechanical energy necessary to generate the pressure differential described previously in this paragraph.

The motor controller 142 is an electric circuit. The motor controller 142 controls the operation of the electric motor that powers the pump 141. The motor controller 142 controls the flow of hand sanitizer 136 through the pump 141. The motor controller 142 controls the amount of time the pump 141 pumps the hand sanitizer 136. The motor controller 142 controls the dose of the hand sanitizer 136 dispensed by the invention 100 by controlling the amount of time the pump 141 runs to dispense the dose. The motor controller 142 further comprises a motor controller 142 input 143 and a motor controller 142 output 144.

The motor controller 142 input 143 is a circuit terminal of the motor controller 142 that electrically connects to the flip flop 123. The motor controller 142 input 143 receives the second electric signal from the flip flop 123. The motor controller 142 output 144 is a circuit terminal of the motor controller 142 that electrically connects to the flip flop 123. The motor controller 142 output 144 transmits the third electric signal to the flip flop 123. Upon detection of the second electric signal at the motor controller 142 input 143, the motor controller 142 initiates the operating cycle of the pump 141. By operating cycle is meant that the pump 141 operates for a previously determined amount of time after which the operation of the pump 141 is discontinued. The motor controller 142 generates the third electric signal at the motor controller 142 output 144 after the motor controller 142 has completed the operating cycle of the pump 141.

The motion sensor 122 is an electric sensor. The motion sensor 122 monitors the exterior space around the discharge nozzle 133 for indications of motions. Specifically, the motion sensor 122 monitors a field of view that is centered on the discharge nozzle 133. The motion sensor 122 electrically connects to the flip flop 123. When the motion sensor 122 detects motion within the field of view of the motion sensor 122, the motion sensor 122 sends a first electric signal to the flip flop 123 that triggers the flip flop 123 to initiate the operating cycle of the pump 141 system 121.

The flip flop 123 is an electrical circuit. The flip flop 123 is defined and described elsewhere in this disclosure. The flip flop 123 monitors the motion sensor 122. The flip flop 123 receives the first electrical signal from the motion sensor 122 that causes the flip flop 123 to transmit a second electric signal to the motor controller 142 input 143 of the motor controller 142 that initiates the operating cycle of the pump 141 system 121. The flip flop 123 receives a third electric signal from the motor controller 142 output 144 of the motor controller 142 that causes the flip flop 123 to reset to the condition where the flip flop 123 monitors the motion sensor 122. The flip flop 123 comprises a set input 151, a reset input 152, a q output 153, and a q-not output 154.

The set input 151 is a circuit terminal of the flip flop 123. The set input 151 forms an electrical connection with the motion sensor 122 such that the set input 151 receives the first electric signal as a voltage when the motion sensor 122 detects motion in its field of view. The reset input 152 is a circuit terminal of the flip flop 123. The reset input 152 forms an electrical connection with the motor controller 142 output 144 of the motor controller 142 input 143 such that the motion sensor 122 receives the third electric signal as a voltage when the motor controller 142 had completed the operating cycle of the pump 141.

The q output 153 is a circuit terminal of the flip flop 123. The q output 153 electrically connects to the motor controller 142 input 143. The q output 153 generates the second electric signal in the form of a voltage to the motor controller 142 input 143 upon detection by the set input 151 of the first electric signal from the motion sensor 122. The flip flop 123 generates zero volts at the q output 153 upon detection by the reset input 152 of the third electric signal from the motor controller 142 output 144. The q-not output 154 is a circuit terminal of the flip flop 123. The signal generated by the q-not output 154 is not used in the first potential embodiment of the disclosure.

The power circuit 124 is an electrical circuit. The power circuit 124 powers the operation of the control circuit 102. The power circuit 124 is an electrochemical device. The power circuit 124 converts chemical potential energy into the electrical energy required to power the control circuit 102. The power circuit 124 comprises a battery 161, a diode 162, a charging port 163, and an external power source 164. The external power source 164 further comprises a charging plug 165. The battery 161, the diode 162, the charging port 163, the external power source 164, and the charging plug 165 are electrically interconnected. The battery 161 further comprises a first positive terminal 171 and a first negative terminal 181. The external power source 164 further comprises a second positive terminal 172 and a second negative terminal 182.

The battery 161 is an electrochemical device. The battery 161 converts chemical potential energy into the electrical energy used to power the control circuit 102. The battery 161 is a commercially available rechargeable battery 161. The chemical energy stored within the rechargeable battery 161 is renewed and restored through the use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The diode 162 is an electrical device that allows current to flow in only one direction. The diode 162 installs between the rechargeable battery 161 and the charging port 163 such that electricity will not flow from the first positive terminal 171 of the rechargeable battery 161 into the second positive terminal 172 of the external power source 164.

In the first potential embodiment of the disclosure, the external power source 164, the charging plug 165, and the charging port 163 are compatible with USB power requirements. The diode 162 is a light emitting diode (LED).

The following definitions were used in this disclosure:

Alcohol: As used in this disclosure, an alcohol refers to an organic chemical structure that comprises a hydroxyl functional group.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is further defined with a hood panel and a roof panel. The automobile is often defined with a trunk panel.

Battery: As used in this disclosure, a battery is a chemical device consisting of one or more cells, in which chemical energy is converted into electricity and used as a source of power. Batteries are commonly defined with a positive terminal and a negative terminal.

Chemical: As used in this disclosure, a chemical refers to a substance of a known or fixed composition. The term chemical is used to describe the substance when the details of the composition of the substance or properties of the substance are considered relevant to the disclosure at bar. The term properties is taken to mean both the measurable properties of the substance and the interactions of a first chemical with a second chemical. The term compound is considered a synonym for the term chemical. The term chemistry refers to the study and the use of the knowledge of the composition and properties of chemicals. The terms chemical reaction refers to the interactions between two or more chemical structures.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove pathogens, dirt and detritus from a surface.

Cleaning Solution: As used in this disclosure, a cleaning solution is a chemical solution that contains a solvent used to dissolve a cleaning agent.

Clip: As used in this disclosure, a clip is a fastener that attaches to an object by gripping or clasping the object. A clip is typically spring loaded.

Closed Position: As used in this disclosure, a closed position refers to a moving structure that is in an orientation that prevents the insertion of a first object into a second object. The closed position is often referred to as an object being "closed." Always use orientation.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Dose: As used in this disclosure, the term dose refers to a specified measured quantity of a chemical substance that is to be incorporated or introduced into an organism or a mixture such as a recipe or a solution. The term dose often, but not necessarily, implies the introduction of a therapeutic substance or a pharmacologically active media into a patient.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

External Power Source: As used in this disclosure, an external power source is a source of the energy that is externally provided to enable the operation of the present disclosure. Examples of external power sources include, but are not limited to, electrical power sources and compressed air sources.

Field of View: As used in this disclosure, a field of view refers to one or more angles that delimits an area from which electromagnetic radiation will be sensed by a person or an image sensor.

Flip Flop: As used in this disclosure, a flip flop is a bi-stable electronic device that is used to store information. The stable state of the flip flop can be changed through the application of one or more control signals. The flip flop is a circuit that is often used to store information. The flip flop circuit comprises a plurality of inputs, referred to as the set input and the reset input, and a plurality of outputs, referred to as Q and not Q. When a temporary positive voltage is applied to the set input, the Q output actuates to a positive voltage relative to the not Q output (which is generally set to the electrical ground voltage). The Q output remains at the positive voltage until a new temporary input voltage is received. When a temporary positive voltage is applied to the reset input, the not Q output actuates to a positive voltage relative to the Q output (which is generally set to the electrical ground voltage). The not Q output remains at the positive voltage until a new temporary input voltage is received.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Gas: As used in this disclosure, a gas refers to a state (phase) of matter that is fluid and that fills the volume of the structure that contains it. Stated differently, the volume of a gas always equals the volume of its container.

Hand Sanitizer: As used in this disclosure, a hand sanitizer is a cleaning solution used for disinfecting hands. The hand sanitizer is a gel that has a high viscosity and high volatility. The high viscosity of the hand sanitizer allows the sanitizer to be held in a hand as a mass until the hand sanitizer is rubbed on the hands. The high volatility allows the hand sanitizer to evaporate rapidly after application. The hand sanitizer typically uses an alcohol as the cleaning agent.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

LED: As used in this disclosure, an LED is an acronym for a light emitting diode. A light emitting diode is a diode that is also a light source.

Lid: As used in this disclosure, a lid is a removable cover that is placed over an opening of a hollow structure to enclose the hollow structure.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Metered Pump: As used in this disclosure, a metered pump is a pump that pumps a fluid at a specified volumetric flow rate that is independent of the pressure of the fluid entering the pump. The accuracy of a metered pump is assumed to be less than 3% of the specified volumetric flow rate over the specified operating range of the fluid pressure entering the pump. Commercially available metered pumps exist that are significantly more accurate than 3%.

Motion Sensor: As used in this disclosure, a motion sensor refers to a commercially available sensor that generates an electrical signal should the motion sensor detect movement within its field of view. See break beam sensor Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

Mount: As used in this disclosure, a mount is a mechanical structure that attaches or incorporates a first object to a second object.

Non-Polar Molecule: As used in this disclosure, a non-polar molecule refers to a molecular structure that: a) is electrically neutral; and, b) has a uniform spatial distribution of the electrons within the molecule.

Nozzle: As used in this disclosure, a nozzle is a device that receives fluid under pressure and releases the fluid in a controlled manner into an environment.

Open Position: As used in this disclosure, an open position refers to a moving structure that is in an orientation that presents that allows the insertion of a first object into a second object. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Phase: As used in this disclosure, phase refers to the state of the form of matter. The common states of matter are solid, liquid, gas, and plasma.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it.

Plug: As used in this disclosure, a plug is an electrical termination that electrically connects a first electrical circuit to a second electrical circuit or a source of electricity. As used in this disclosure, a plug will have two or three metal pins.

Polar Molecule: As used in this disclosure, a polar molecule refers to a molecular structure that: a) is electrically neutral; but, b) does not have a uniform spatial distribution of the electrons within the molecule. A polar molecule will present one or more electrically positive poles and the same number of electrically negative poles within the molecular structure.

Polarity: As used in this disclosure, the term polarity is used to describe a physical property or physical characteristic wherein: 1) the physical property or physical characteristic manifests two opposing attributes, tendencies, characteristics, or principals; and, 2) the two opposing attributes, tendencies, characteristics, or principals have an intrinsic separation, alignment, or orientation.

Port: As used in this disclosure, a port is an electrical termination that is used to connect a first electrical circuit to a second external electrical circuit. In this disclosure, the port is designed to receive a plug.

Pouch: As used in this disclosure, a pouch is an open space that is bounded by a flexible material.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Solid: As used in this disclosure, a solid refers to a state (phase) of matter that: 1) has a fixed volume; and, 2) does not flow.

Solution: As used in this disclosure, a solution is a uniform mixture of two or more compounds in a liquid phase. The major component selected from the two or more compounds that forms the solution is called the solvent. The components remaining in the two or more compounds are called the solute. A polar solvent is a solvent formed from polar molecules. A non-polar solvent is a solvent formed from non-polar molecules. The rule of thumb that "like dissolves like" states that: a) solutes formed from polar molecules will dissolve in polar solvents but will not dissolve in non-polar solvents; and, b) solutes formed from non-polar molecules will dissolve in non-polar solvents but will not dissolve in polar solvents. Use Polarity Polar Molecule and non-polar molecule Superior: As used in this disclosure, the term superior refers to a directional reference that is parallel to and in the opposite direction of the force of gravity when an object is positioned or used normally.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Vent: As used in this disclosure, a vent is an opening in a structure that allows for the flow of gas through the boundary of the structure.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Viscosity: As used in this disclosure, viscosity refers to the resistance of a liquid or an elastic material to deformation. Higher viscosity would refer to a greater resistance to flow or to deformation.

Viscous: As used in this disclosure, a viscous material is a material with a viscosity such that the viscous material has characteristics intermediate between a liquid and a solid.

Volatile: As used in this disclosure, volatile refers to a substance that will evaporate or sublimate into a gas state at normal temperature and pressure.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle dash-mounted hand sanitizer dispenser comprising
    a reservoir structure and a control circuit;
    wherein the reservoir structure contains the control circuit;
    wherein the vehicle dash-mounted hand sanitizer dispenser is configured for use with a passenger compartment of a vehicle;
    wherein the vehicle dash-mounted hand sanitizer dispenser is configured to mount on a vent of said vehicle;
    wherein the vehicle dash-mounted hand sanitizer dispenser stores and dispenses a hand sanitizer;
    wherein the control circuit provides the motive forces necessary to pump the hand sanitizer into the passenger compartment;
    wherein the control circuit comprises a pump system, a motion sensor, a flip flop, and a power circuit;
    wherein the power circuit powers the operation of the control circuit;
    wherein the power circuit is an electrochemical device;
    wherein the power circuit comprises a battery, a diode, a charging port, and an external power source;
    wherein the external power source further comprises a charging plug;
    wherein the battery, the diode, the charging port, the external power source, and the charging plug are electrically interconnected;
    wherein the battery further comprises a first positive terminal and a first negative terminal;
    wherein the external power source further comprises a second positive terminal and a second negative terminal.

2. The vehicle dash-mounted hand sanitizer dispenser according to claim 1 wherein the reservoir structure forms the fluidic connection necessary to: a) contain the hand sanitizer; and, b) discharge the hand sanitizer into the passenger compartment.

3. The vehicle dash-mounted hand sanitizer dispenser according to claim 2
    wherein the control circuit is an electric circuit;
    wherein the control circuit initiates the operation by detecting motion near the discharge point for the hand sanitizer.

4. The vehicle dash-mounted hand sanitizer dispenser according to claim 3
    wherein the reservoir structure is a mechanical structure;
    wherein the reservoir structure forms a negative space that contains the hand sanitizer;
    wherein the reservoir structure forms the fluidic connections necessary to discharge the hand sanitizer from the reservoir structure for use;
    wherein the reservoir structure removably attaches to the vent of the vehicle.

5. The vehicle dash-mounted hand sanitizer dispenser according to claim 4
    wherein the control circuit is an electric circuit;
    wherein the control circuit controls the operation of the reservoir structure;
    wherein the control circuit provides the motive forces necessary to discharge the hand sanitizer from the reservoir structure;
    wherein the control circuit detects motion in the vicinity of the discharge nozzle;
    wherein upon detection of motion in the vicinity of the discharge nozzle, the control circuit discharges a previously determined amount of hand sanitizer from the reservoir structure.

6. The vehicle dash-mounted hand sanitizer dispenser according to claim 5
    wherein the control circuit is an independently powered electric circuit;
    wherein by independently powered is meant that the control circuit can operate without an electrical connection to an external power source.

7. The vehicle dash-mounted hand sanitizer dispenser according to claim 6
    wherein the reservoir structure includes a mount structure;
    wherein the mount structure removably attaches the reservoir structure to the vent of the vehicle.

8. The vehicle dash-mounted hand sanitizer dispenser according to claim 7
    wherein the pump system, the motion sensor, the flip flop, and the power circuit are electrically interconnected.

9. The vehicle dash-mounted hand sanitizer dispenser according to claim 8
    wherein the mount structure is a mechanical structure;
    wherein the mount structure forms a first clip structure that removably attaches to the reservoir structure;
    wherein the mount structure forms a second clip structure that removably attaches to the vent of the vehicle.

10. The vehicle dash-mounted hand sanitizer dispenser according to claim 9
    wherein the reservoir structure physically contains the control circuit;
    wherein the reservoir structure physically contains the hand sanitizer;

wherein the reservoir structure physically forms the spaces and fluidic connections necessary to: a) store the hand sanitizer; and b) transport the hand sanitizer through the reservoir structure for discharge.

11. The vehicle dash-mounted hand sanitizer dispenser according to claim 10
wherein the reservoir structure comprises a reservoir shell, a reservoir lid, and a discharge nozzle;
wherein the reservoir lid and the discharge nozzle attach to the reservoir shell.

12. The vehicle dash-mounted hand sanitizer dispenser according to claim 11
wherein the reservoir shell is a mechanical structure;
wherein the reservoir shell is a hollow structure;
wherein the reservoir shell forms the physical space that contains the control circuit, the reservoir pouch, and the hand sanitizer;
wherein the mount structure removably attaches to the reservoir shell.

13. The vehicle dash-mounted hand sanitizer dispenser according to claim 12
wherein the reservoir shell comprises a reservoir pouch;
wherein the reservoir pouch further comprises a hand sanitizer;
wherein the reservoir pouch is a pouch;
wherein the pouch is defined elsewhere in this disclosure;
wherein the reservoir pouch is a flexible structure;
wherein the reservoir pouch is formed from a fluid impermeable material;
wherein the reservoir pouch forms a containment structure;
wherein the reservoir pouch contains the hand sanitizer;
wherein the reservoir pouch and the contained hand sanitizer are sized such that the reservoir pouch and the hand sanitizer insert into the hollow interior of the reservoir structure;
wherein the reservoir pouch inserts into the reservoir shell such that the reservoir pouch forms a fluidic connection with the reservoir structure that allows the hand sanitizer to flow from the reservoir pouch into the discharge nozzle;
wherein the hand sanitizer is a fluid phase chemical solution.

14. The vehicle dash-mounted hand sanitizer dispenser according to claim 13
wherein the discharge nozzle is a nozzle structure that discharges the hand sanitizer from the reservoir structure;
wherein the discharge nozzle receives the hand sanitizer under pressure from the pump system of the control circuit for discharge into the exterior space surrounding the reservoir structure.

15. The vehicle dash-mounted hand sanitizer dispenser according to claim 14
wherein the reservoir lid is a mechanical structure that controls access to the hollow interior of the reservoir shell;
wherein the reservoir lid encloses the open face of the pan structure of the reservoir shell;
wherein the reservoir lid attaches to the reservoir shell;
wherein the reservoir lid further comprises a hinge;
wherein the hinge is a fastening structure;
wherein the hinge is a rotating structure;
wherein the hinge attaches the reservoir lid to the reservoir shell such that the reservoir lid rotates relative to the reservoir lid;
wherein the hinge attaches the reservoir lid to the reservoir shell such that the reservoir lid rotates between an open position and a closed position.

16. The vehicle dash-mounted hand sanitizer dispenser according to claim 15
wherein the pump system is an electrically powered mechanical system;
wherein the pump system generates a pressure differential that pumps the hand sanitizer from the reservoir pouch to the discharge nozzle for discharge from the reservoir structure;
wherein the motion sensor is an electric sensor;
wherein the motion sensor monitors the exterior space around the discharge nozzle for indications of motions;
wherein specifically, the motion sensor monitors a field of view that is centered on the discharge nozzle;
wherein the motion sensor electrically connects to the flip flop;
wherein when the motion sensor detects motion within the field of view of the motion sensor, the motion sensor sends a first electric signal to the flip flop that triggers the flip flop to initiate the operating cycle of the pump system;
wherein the flip flop is an electrical circuit;
wherein the flip flop is defined and described elsewhere in this disclosure;
wherein the flip flop monitors the motion sensor;
wherein the flip flop receives the first electrical signal from the motion sensor that causes the flip flop to transmit a second electric signal to the motor controller input of the motor controller that initiates the operating cycle of the pump system;
wherein the flip flop receives a third electric signal from the motor controller output of the motor controller that causes the flip flop to reset to the condition where the flip flop monitors the motion sensor.

17. The vehicle dash-mounted hand sanitizer dispenser according to claim 16
wherein the pump system comprises a pump and a motor controller;
wherein the pump is a mechanical structure;
wherein the pump is a metered pump;
wherein the pump generates a pressure differential that: a) draws the hand sanitizer from the reservoir pouch; and, b) pumps the drawn hand sanitizer to the discharge nozzle;
wherein the pump is an electrically powered device;
wherein by electrically powered is meant that the pump incorporates an electric motor that generates the rotational mechanical energy necessary to generate the pressure differential described previously in this paragraph;
wherein the motor controller is an electric circuit;
wherein the motor controller controls the operation of the electric motor that powers the pump;
wherein the motor controller controls the flow of hand sanitizer through the pump;
wherein the motor controller controls the amount of time the pump pumps the hand sanitizer;
wherein the motor controller controls the dose of the hand sanitizer dispensed by the vehicle dash-mounted hand sanitizer dispenser by controlling the amount of time the pump runs to dispense the dose;
wherein the motor controller further comprises a motor controller input and a motor controller output;

wherein the motor controller input is a circuit terminal of the motor controller that electrically connects to the flip flop;

wherein the motor controller input receives the second electric signal from the flip flop;

wherein the motor controller output is a circuit terminal of the motor controller that electrically connects to the flip flop;

wherein the motor controller output transmits the third electric signal to the flip flop;

wherein upon detection of the second electric signal at the motor controller input, the motor controller initiates the operating cycle of the pump;

wherein by operating cycle is meant that the pump operates for a previously determined amount of time after which the operation of the pump is discontinued;

wherein the motor controller generates the third electric signal at the motor controller output after the motor controller has completed the operating cycle of the pump.

18. The vehicle dash-mounted hand sanitizer dispenser according to claim 17 wherein the flip flop comprises a set input, a reset input, a q output, and a q-not output;

wherein the set input is a circuit terminal of the flip flop;

wherein the set input forms an electrical connection with the motion sensor such that the set input receives the first electric signal as a voltage when the motion sensor detects motion in its field of view;

wherein the reset input is a circuit terminal of the flip flop;

wherein the reset input forms an electrical connection with the motor controller output of the motor controller input such that the motion sensor receives the third electric signal as a voltage when the motor controller had completed the operating cycle of the pump;

wherein the q output is a circuit terminal of the flip flop;

wherein the q output electrically connects to the motor controller input;

wherein the q output generates the second electric signal in the form of a voltage to the motor controller input upon detection by the set input of the first electric signal from the motion sensor;

wherein the flip flop generates zero volts at the q output upon detection by the reset input of the third electric signal from the motor controller output;

wherein the q-not output is a circuit terminal of the flip flop.

19. The vehicle dash-mounted hand sanitizer dispenser according to claim 18 wherein the battery is a rechargeable battery;

wherein the charging port is an electrical circuit that reverses the polarity of the rechargeable battery;

wherein the charging port forms an electrical connection to an external power source using a charging plug;

wherein the charging plug forms a detachable electrical connection with the charging port;

wherein the charging port receives electrical energy from the external power source through the charging plug;

wherein the diode is an electrical device that allows current to flow in only one direction;

wherein the diode installs between the rechargeable battery and the charging port such that electricity will not flow from the first positive terminal of the rechargeable battery into the second positive terminal of the external power source.

* * * * *